United States Patent [19]
Yoon

[11] Patent Number: 5,746,601
[45] Date of Patent: May 5, 1998

[54] AUDIO SYSTEM WITH LANGUAGE EXERCISE FUNCTION

[76] Inventor: Man Hee Yoon, Nakwon Apt. 1406-Ho, 284-6 Nakwon-dong, Jongro-ku, Seoul 110-320, Rep. of Korea

[21] Appl. No.: 553,470

[22] PCT Filed: May 18, 1993

[86] PCT No.: PCT/KR93/00042

§ 371 Date: Nov. 15, 1995

§ 102(e) Date: Nov. 15, 1995

[87] PCT Pub. No.: WO94/27266

PCT Pub. Date: Nov. 24, 1994

[51] Int. Cl.⁶ .................................................. G09B 19/00
[52] U.S. Cl. .......................... 434/156; 434/319; 434/320
[58] Field of Search ................................ 434/156, 157, 434/169, 185, 307 R, 308–321, 365; 364/419.01, 419.03; 381/35, 43, 51–53; 395/2, 152, 927; 369/48; 360/22, 49, 69, 70; 379/88, 196, 210, 211, 265, 266; 345/153, 186

[56] References Cited

U.S. PATENT DOCUMENTS

| | | | |
|---|---|---|---|
| 3,662,121 | 5/1972 | Cruger | 434/320 X |
| 3,705,271 | 12/1972 | De Bell et al. | 434/320 X |
| 3,911,494 | 10/1975 | Wilson et al. | 434/319 X |
| 3,913,135 | 10/1975 | Damlamian | 434/308 X |
| 4,310,838 | 1/1982 | Juso et al. | |
| 4,380,438 | 4/1983 | Okamoto | 434/320 X |
| 4,406,626 | 9/1983 | Anderson et al. | 434/308 X |
| 4,555,859 | 12/1985 | Corso | 434/308 X |
| 4,586,905 | 5/1986 | Groff | 434/308 X |
| 4,615,680 | 10/1986 | Tomatis | 434/185 X |
| 4,684,349 | 8/1987 | Ferguson et al. | |
| 4,690,645 | 9/1987 | Ukisu | |
| 4,863,384 | 9/1989 | Slade | 434/308 X |
| 4,968,254 | 11/1990 | Gangwere, Jr. et al. | 434/309 X |
| 5,087,205 | 2/1992 | Chen | 434/320 |
| 5,569,038 | 10/1996 | Tubman et al. | 434/308 |

FOREIGN PATENT DOCUMENTS 4013070  10/1991  Germany.

*Primary Examiner*—Joe Cheng
*Attorney, Agent, or Firm*—Morgan & Finnegan, LLP

[57] ABSTRACT

An audio system with a language exercise function, the system including a cassette tape deck, comprising a keyboard, an output display, a microcomputer to which the keyboard and the output display are connected, a voice synthesizer memory unit connected to the microcomputer, the memory unit including a plurality of random access memories and a voice synthesizer circuit, and an audio level sensor connected to the cassette tape deck which is connected to the microcomputer so that automatic repeated playback and pronunciation functions of the cassette tape deck are executed.

4 Claims, 7 Drawing Sheets

AUDIO SYSTEM WITH LANGUAGE EXERCISE FUNCTION

BACKGROUND OF THE INVENTION

1. Field of the Invention

The invention relates to an audio system with a radio tuner and a cassette deck system, and more particularly to such an audio system enabling a combined use of a language exercise function by connecting a key board input unit thereto and the like.

2. Background of the Prior Art

Conventionally, a language exercise has been executed by using a cassette player or a video display as an auxiliary audio equipment for a language exercise. In such an equipment, however, when an exerciser wishes to hear a desirable sentence again that was already outputted from the equipment, it is possible to re-listen the sentence, only by manually operating manipulation buttons such as a stop button, a rewind button and a play button in sequence. Moreover, an effective language exercise is impossible in the above-mentioned equipment, because a playback speed is always constant.

For solving the above-mentioned problems, a proposal has been already made by the applicant, which is an automatic sentence selection/repetition apparatus disclosed in Korean Patent Publication No. 31,287. This apparatus is a remarkable invention, in that a function capable of automatically selecting a sentence or a song is allowed to a cassette deck so that the user may hear a sentence automatically played back as many as desired, thus the effect of a language exercise may enhance considerably. But this must go through the course of rewinding a tape by the machine itself for a reproduction of sound, which acts as a factor of shortening a tape life. Furthermore, such a cassette deck can not be used in combination with a video display. Also, the language exercise function does not run in parallel with general functions of an audio system.

SUMMARY OF THE INVENTION

Therefore, the present invention has been made in view of the disadvantages encountered in the above-mentioned audio and video systems as an auxiliary equipment and an object of the invention is an audio system connectable with a video system, enabling a keyboard input unit to be connected thereto, thereby capable of achieving automatic repeated listening and pronunciation drill functions, the necessary functions in a language exercise, by a simple keyboard manipulation.

Another object of the invention is to provide an audio system enabling a repeated hearing of a sound from a video tape, to enhance an audio-visual education effect.

Another object of the invention is to provide an audio system comprising a voice synthesizer memory unit capable of extending the life of the audio system.

In accordance with one aspect, the present invention provides an audio system with a language exercise function, to which a video system is connectable, the system including a cassette tape deck, comprising: a keyboard for generating a plurality of function key inputs for performing a double deck function, a simultaneous recording function, a sentence memory function, a repeat memory function, and an automatic playback repetition function; and voice synthesizer memory means for enabling automatic repeated playback and pronunciation functions of the cassette tape deck and the video system.

In accordance with another aspect, the present invention provides an audio system with a language exercise function, the system including a cassette tape deck, comprising: a keyboard; an output display; a microcomputer to which the keyboard and the output display are connected; a voice synthesizer memory means connected to the microcomputer, the voice synthesizer memory means including a plurality of random access memories and a voice synthesizer circuit; and an audio level sensor connected to the cassette tape deck which is connected to the microcomputer so that automatic repeated playback and pronunciation functions of the cassette tape deck are executed.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
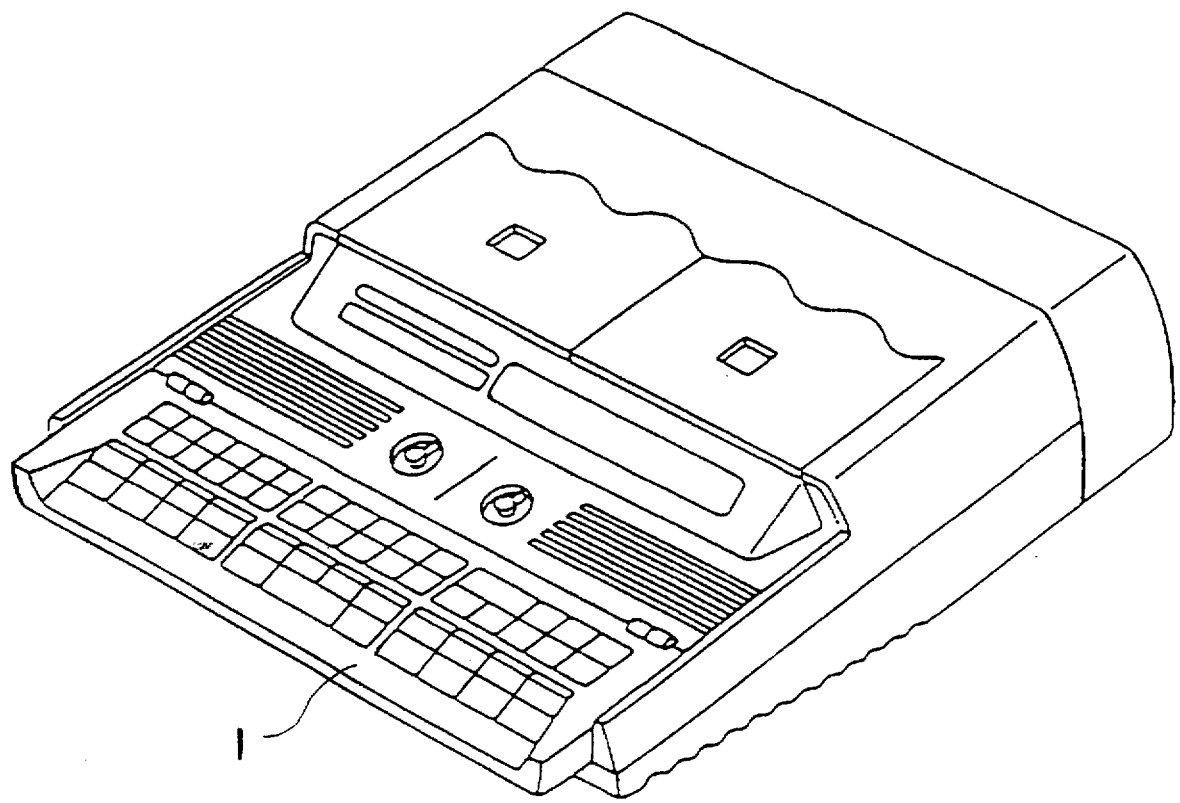
FIG. 1 is a perspective view showing an audio system according to the present invention.
Figure 2:
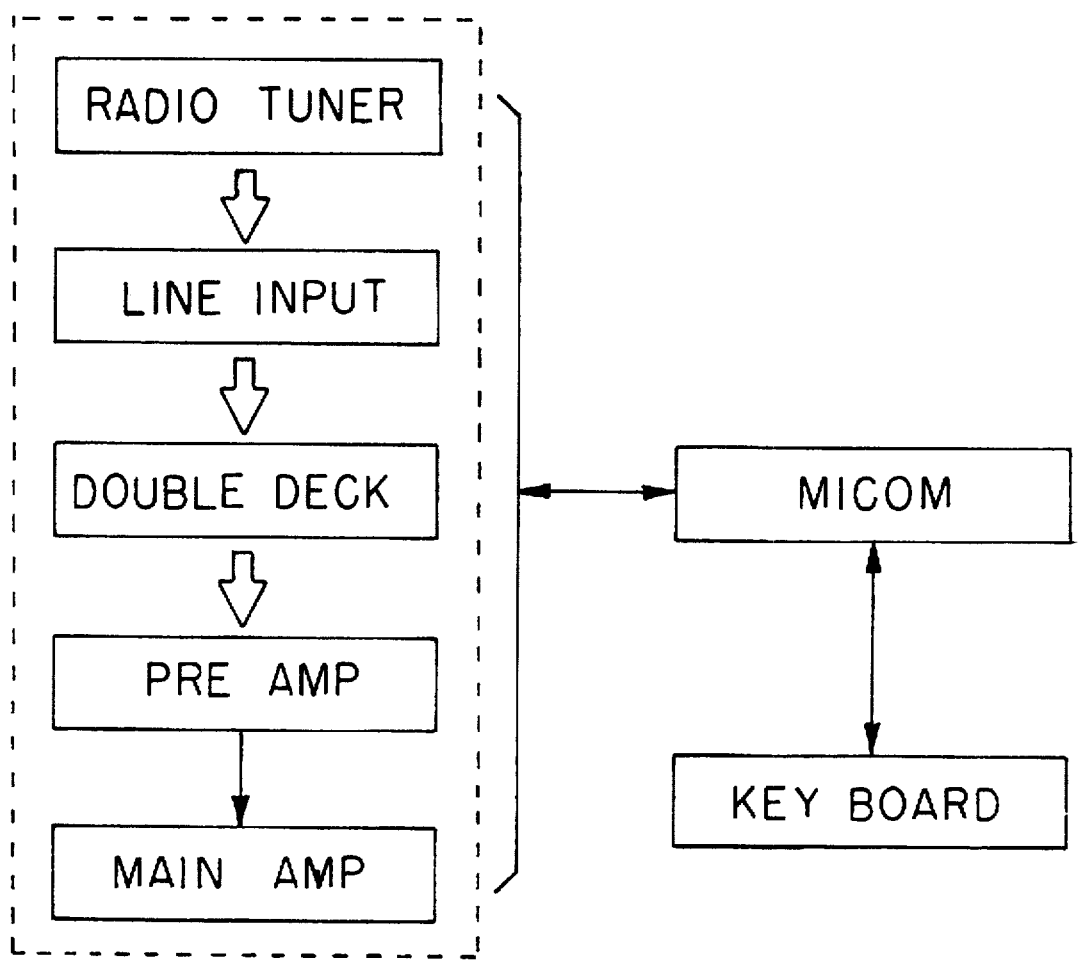
FIG. 2 is a block diagram illustrating the audio system according to the present invention.
Figure 6:
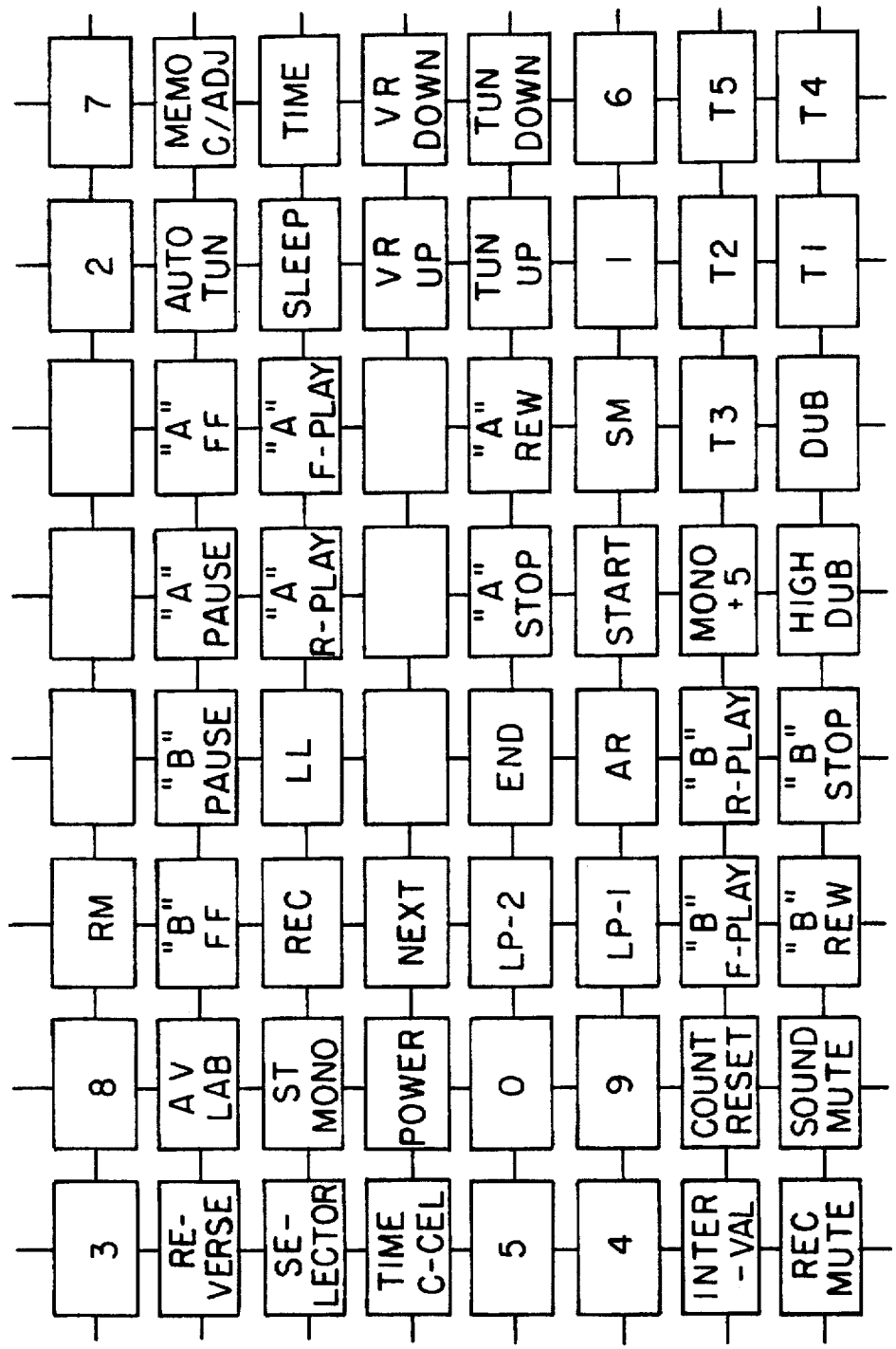
FIG. 6 is a detailed diagram illustrating a keyboard matrix according to the present invention.

FIG. 1 illustrates an audio system in accordance with the present invention which is constructed so that a video equipment (not shown) including a video cassette recorder can be associated therewith. It is also constructed to connect a keyboard 1 comprising various function keys (shown in detail in FIG. 6) thereto, so as to perform a language exercise function as well as general functions of the audio system.

Figure 3:
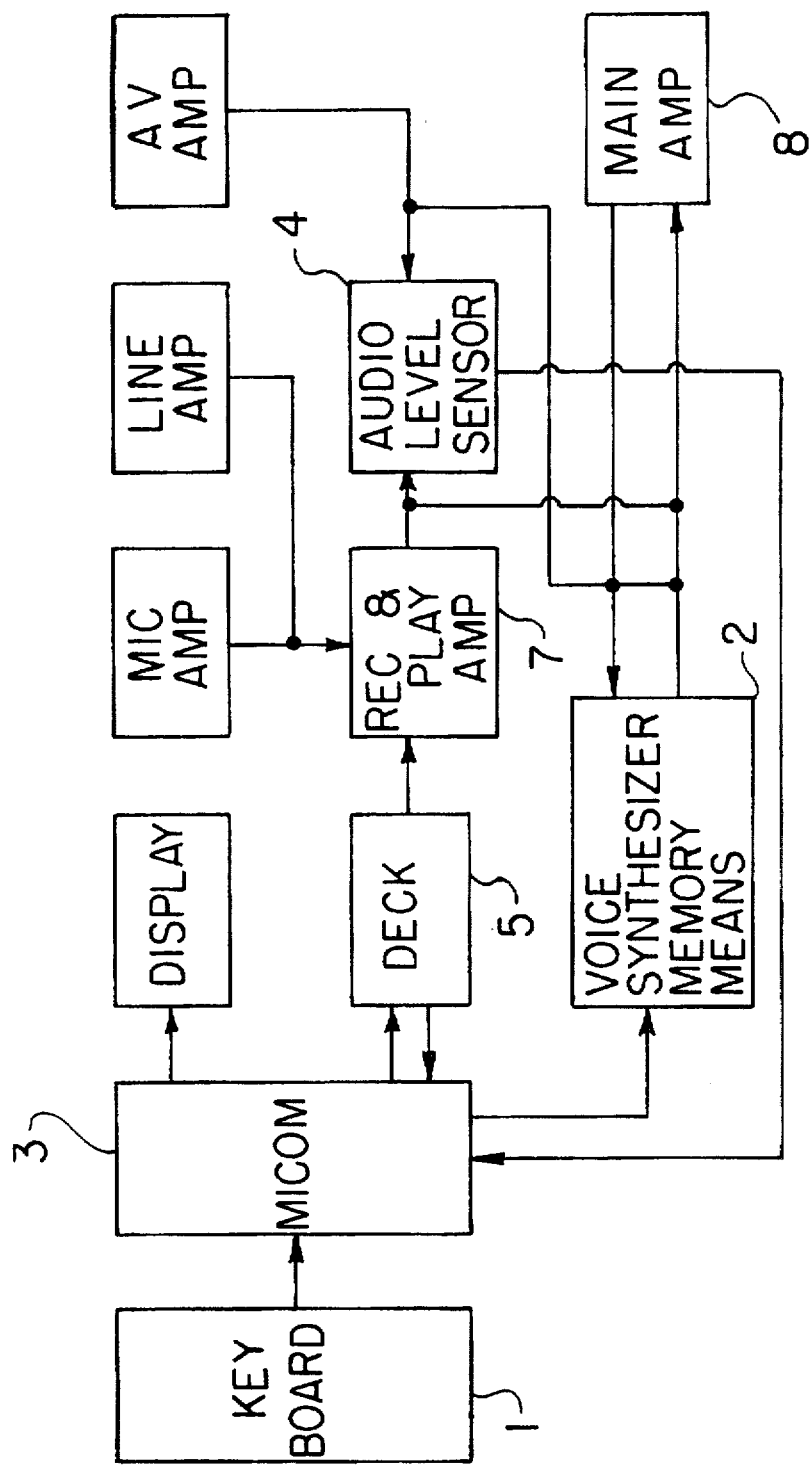
FIG. 3 is a circuit diagram illustrating the audio system according to the present invention.
Figure 4:
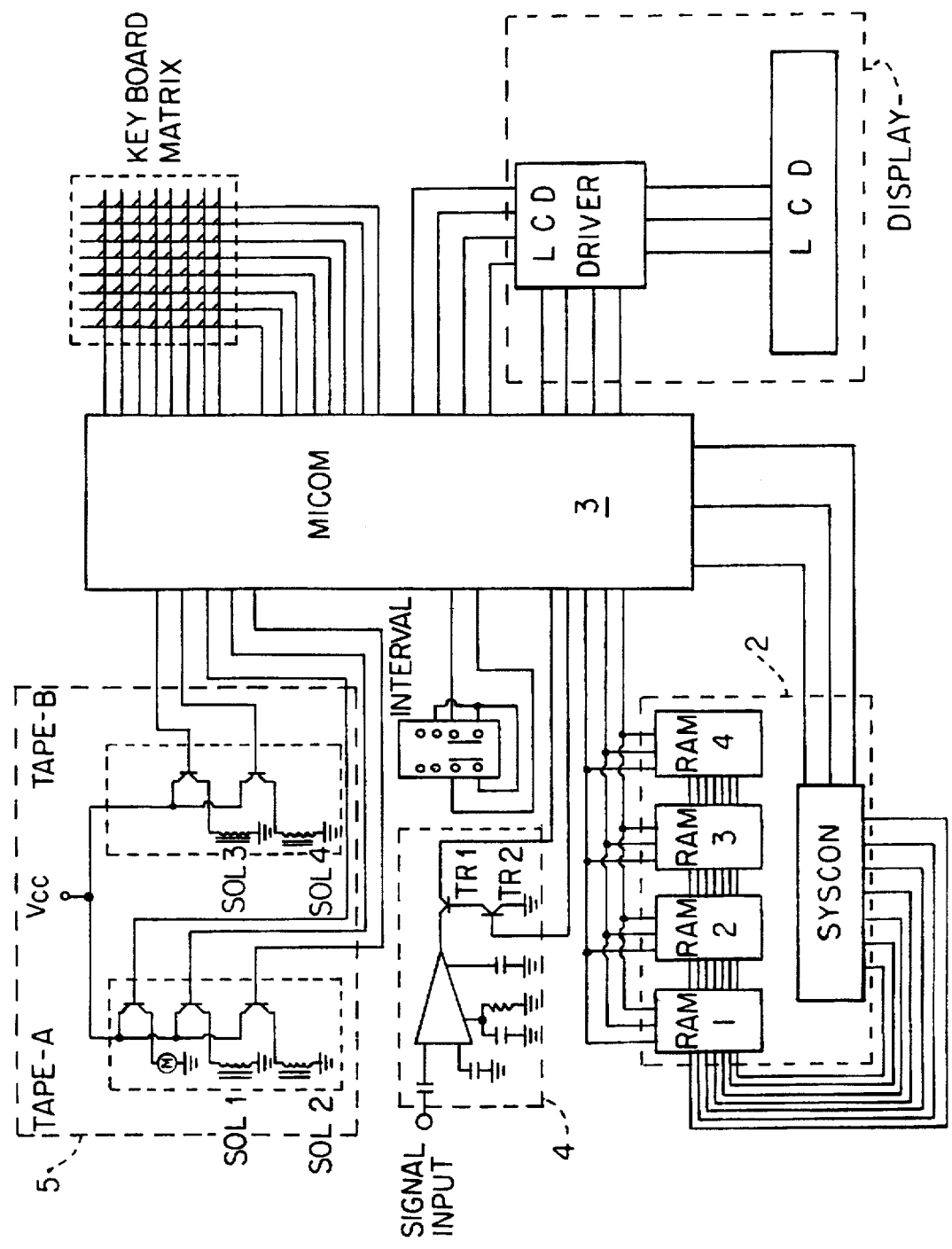
FIG. 4 is a circuit diagram illustrating a cassette tape deck circuit according to the present invention.
Figure 5:
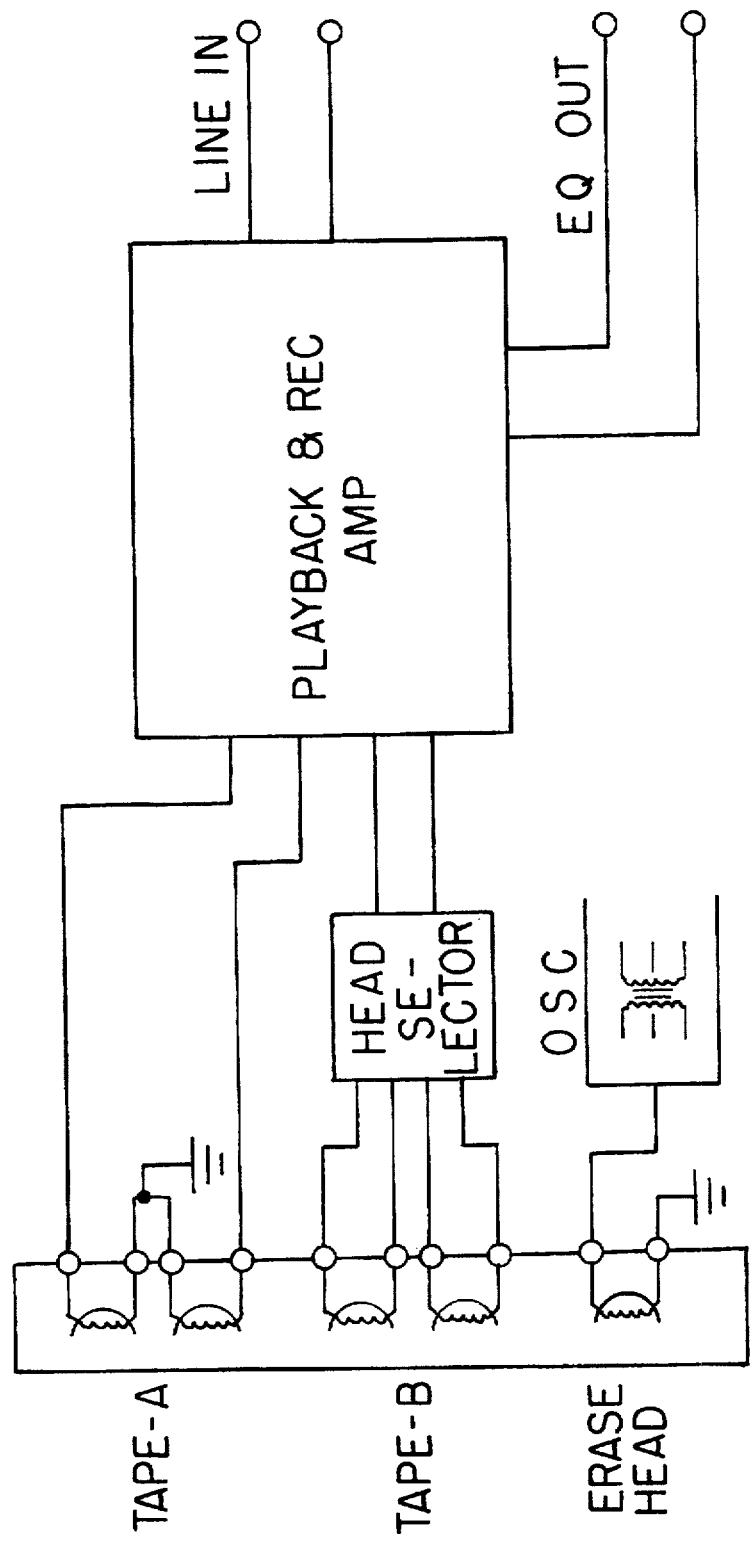
FIG. 5 is a circuit diagram illustrating a playback and record circuit according to the present invention.

As shown in FIGS. 3 and 4, the audio system of the present invention comprises a voice synthesizer memory means 2 connected to a microcomputer 3 in which a predetermined program is stored. With these constructions, the audio system has a function of allowing the sounds recorded on an audio or video tape to be played back automatically repeatedly. Connected to the microcomputer 3 are the keyboard 1 and a display unit DISPLAY including a liquid crystal display (LCD) drive circuit and an LCD. The voice synthesizer memory means 2 comprises random access memories (RAMs) RAM1 to RAM4 and a voice synthesizer circuit SYSCON. A cassette tape deck 5 is also connected to the microcomputer 3. The output of cassette tape deck 5 is connected to an audio level sensor 4 through a record play amplifier 7, so as to achieve an automatic pronunciation drill function and an automatic playback repetition function.

The important functions of the present system includes a double deck function, a full auto-reverse function, a consecutive playback function from one deck to the other, a simultaneous recording function, an edit function, a pronunciation drill function, a sentence memory function, an automatic playback repetition function, a tape speed control function, an automatic repetition of a sound from a video tape, and a double speed recording function.

Figure 7:
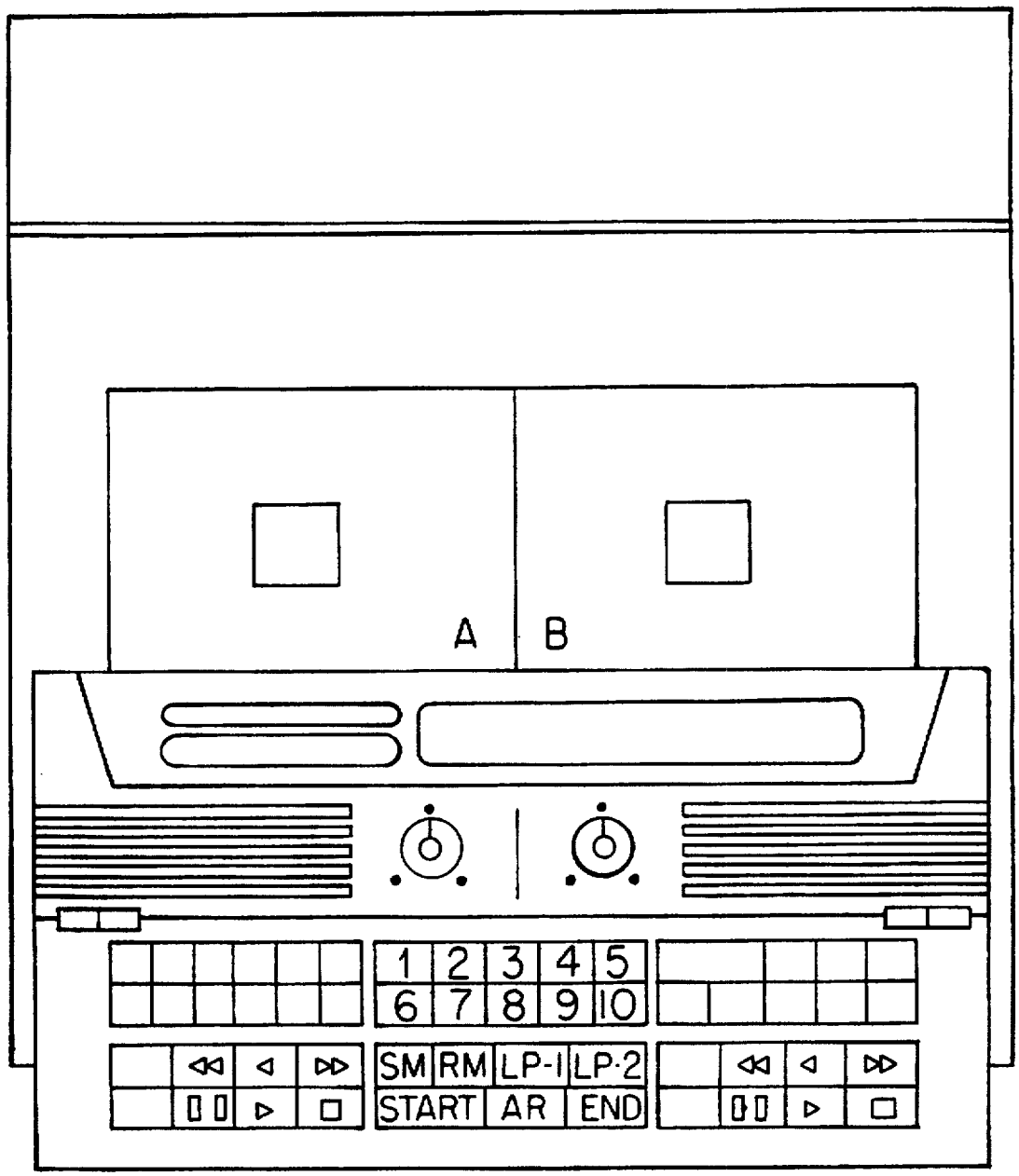
FIG. 7 is a plan view illustrating the audio system of the present invention.

First, with regard to an automatic playback repetition, it can be achieved by using two methods; one is a method of rewinding the tape after the playback; and the other is a method of repeatedly playing back the sound stored in the voice synthesizer memory means 2. In the latter method, the number of automatic playback repetition times is designated by pushing a sentence memory key SM (FIGS. 6 and 7), one of the function keys on the keyboard 1, and a desired one of number keys (Nos. 0 to 9). Then, pushing an auto-repeat key AR allows to sense an unrecorded portion on the tape and then, to play back a sound repeatedly as many as designated. When the audio level sensor 4 (FIG. 4) senses the unrecorded portion on the tape, that is, receives a low level signal at its input, a transistor TR1 connected to the output of the audio level sensor 4 is maintained at its OFF state. Accordingly, a sound is outputted at the main amplifier 8 (FIG. 3), via the microcomputer 3.

Also, pushing a repeat memory key RM (FIG. 7) in the state that the SM key has already been pushed allows a repeated playback of total sentences up to the last designated sentence. Because the course of rewinding is omitted in this case, it is, therefore, expected to extend machine's life time. Then, pushing the auto-repeat key AR key or a play key allows to stop the repeated playback and to play back a sentence next to the repeated sentence. Where the number of playback repetition times is desired to be limited, a selected one of the number keys is manipulated subsequent to pushing the repeat memory key RM so that a sentence is repeated as many as the number of times designated by the selected number key.

Second, with regard to a conversation function, playbacks of sentences one by one are accomplished upon pushing a language partner key LP-2. The conversation function means that when a response to a played-back sentence has been made through a microphone amplifier MIC AMP (FIG. 3), a playback of a next sentence is made. There are two methods by which the conversation function is performed. One method comprises the steps of stopping the running of the tape when the unrecorded portion of the tape is sensed by the audio level sensor 4 during the playback of sentences and then running the tape again according to a command from the microcomputer 3 when a response signal received via the microphone amplifier MIC AMP is sensed by the audio level sensor 4, so as to play back the next sentence. On the other hand, the other method comprises the steps of stopping the running of the tape when the unrecorded portion of the tape is sensed by the audio level sensor 4 during the playback of sentences and then running the tape again according to a command from the microcomputer 3 after a temporal delay time corresponding to the sum of the length (time) of the next sentence and a time of α, even when no response signal received via the microphone amplifier MIC AMP is sensed by the audio level sensor 4, so as to play back the next sentence.

Third, as to a simultaneous recording function, this is performed by pushing the language partner key LP-1 on the keyboard 1. Upon pushing the language partner key LP-1, a sound from a tape deck A is recorded on an R track of a deck B while a sound received via the microphone amplifier MIC AMP is recorded on an L track of the deck B. Thus, simultaneous recordings are achieved.

Fourth, as to a video sound automatic repetition function, it is said to a function that an audio-visual language exerciser, if necessary, can hear only a sound repeatedly from an audio/video system, during an audio-visual language exercise carried out by connecting a video equipment to the audio system. When a video displayed on a screen is stopped in the state that both the repeat memory key RM and the auto-repeat key AR have been pushed, a video sound stored in the voice synthesizer memory means 2 is automatically repeated, without the running of the tape. Accordingly, it is possible to hear a sound repeatedly at a desired playback speed while viewing a stopped or slow video corresponding to the sound and thus to enhance the learning effect of audio-visual education.

Fifth, as to a phone sale exercise function, this is to play back a tape A' loaded in the deck A, while recording the sound played back from the tape A' on an R track of a tape B' loaded in the deck B and recording a microphone sound received via the microphone amplifier MIC AMP on an L track of the tape B'. Upon pushing a recording key on the keyboard 1, the sound played back from the tape A' is recorded for one interval. Then, the recording of the microphone sound is carried out. Thus, the phone sale exercise is achieved.

Also, the audio system of the present invention has a dubbing function for stereo-recording a sound played back from the tape A' on the tape B' and a speed control function for varying a playback speed.

As apparent from the above description, the present invention provides an audio system capable of having a record edit function for eliminating unnecessary portions upon re-recording, recording sounds by intervals upon the repeated playback, and accurately achieving the record by intervals. The audio system also has effects of lengthening the useful life times of head and tape, hearing a sound repeatedly at a desired playback speed while viewing a stopped or slow video corresponding to the sound and thus enhancing the learning effect of audio-visual education, in that a voice memory unit is utilized upon the repeated playback, thereby enabling the head not to be in contact with the tape. The audio system also has an editable recording function and a remote control function. In addition, the audio system uses an audio level sensor (a voice sensor) so that pronunciation exercise and repeated viewing and hearing can be automatically achieved. Thus, the audio system has a language exercise function enabling a comparative analysis between an original pronunciation and a practical pronunciation.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An audio system with a language exercise function, to which a video system is connectable, said system including a cassette tape deck, comprising:

a keyboard for generating a plurality of function key inputs for performing a double deck function, a simultaneous recording function, a sentence memory function, a repeat memory function, and an automatic playback repetition function for at least two repetitions selectively activatable through the keyboard; and voice synthesizer memory means for enabling automatic repeated playback and pronunciation functions of the cassette tape deck and the video system through said selective keyboard activation.

2. An audio system in accordance with claim 1 or claim 4, wherein the keyboard has a repeat memory key and an automatic repeat key for automatically repeating a playback of a video system sound stored in the voice synthesizer memory means, without running the tape, at a state that a video system displayed on a screen is stopped, upon manipulation of the keyboard.

3. An audio system in accordance with claim 1 or claim 4, wherein the cassette tape deck has a double deck function for enabling a simultaneous recording function and a phone sale exercise function for recording a sound played back from one of two tapes on one of two tracks of the other tape for one interval and then recording a microphone sound on the other track of the other tape, upon a manipulation of a record key on the keyboard.

4. An audio system with a language exercise function, said system including a cassette tape deck, comprising:

a keyboard for selectively activating the audio system a plurality of times;

an output display;

a microcomputer to which the keyboard and the output display are connected;

a voice synthesizer memory means connected to the microcomputer, said memory unit including a plurality of random access memories and a voice synthesizer circuit; and an audio level sensor connected to the cassette tape deck which is connected to the microcomputer so that automatic repeated playback and pronunciation functions of the cassette tape deck are executed for the selectively activated plurality of times.

* * * * *